United States Patent [19]

Craig

[11] Patent Number: 4,883,850

[45] Date of Patent: Nov. 28, 1989

[54] PROCESS FOR PREPARATION OF POLYMERS BY SUSPENSION POLYMERIZATION OF VINYL MONOMER IN THE PRESENCE OF HYDROPHOBICALLY MODIFIED WATERSOLUBLE, NONIONIC CELLULOSE ETHER POLYMER IN COMBINATION WITH ELECTROLYTE

[75] Inventor: Daniel H. Craig, Hockessin, Del.

[73] Assignee: Aqualon Company, Wilmington, Del.

[21] Appl. No.: 197,713

[22] Filed: May 23, 1988

Related U.S. Application Data

[63] Continuation-in-part of Ser. No. 64,362, Jun. 22, 1987, abandoned.

[51] Int. Cl.$^4$ ................................................ C08F 2/20
[52] U.S. Cl. ..................................... 526/200; 526/217
[58] Field of Search ................................ 526/200, 234

[56] References Cited

U.S. PATENT DOCUMENTS 3,642,733 2/1972 Anderson ............................ 526/217
4,352,916 10/1982 Landall ............................... 526/200
4,609,512 9/1986 Rigler et al. .
4,684,704 8/1987 Craig .

Primary Examiner—Christopher Henderson
Attorney, Agent, or Firm—Mark D. Kuller

[57] ABSTRACT

A process for manufacture of polymers comprising suspension polymerization of at least one vinyl monomer in the presence of from about 0.01% to about 0.4% by weight, based on the total monomer content, of at least one hydrophobically modified water-soluble, nonionic cellulose ether polymer and an inert electrolyte, and polymers prepared by same.

19 Claims, No Drawings

PROCESS FOR PREPARATION OF POLYMERS BY SUSPENSION POLYMERIZATION OF VINYL MONOMER IN THE PRESENCE OF HYDROPHOBICALLY MODIFIED WATERSOLUBLE, NONIONIC CELLULOSE ETHER POLYMER IN COMBINATION WITH ELECTROLYTE

This a continuation-in-part of U.S. patent application Ser. No. 07/064,362, filed June 22, 1987, now abandoned.

This invention relates to the suspension polymerization (also known as granular, bead, or pearl polymerization due to the shape of the resultant polymer particles) of vinyl monomers. More specifically it relates to the use of certain hydrophobically modified water-soluble, nonionic cellulose ether polymers as stabilizers or suspending aids, in combination with inert electrolytes and/or inert polyelectrolytes, to improve the performance of such a polymerization. The use of an inert electrolyte along with a hydrophobically modified water-soluble, nonionic cellulose ether polymer permits the practitioner to control the particle size distribution, i.e., polydispersity, of the final product. It also permits the practitioner to manufacture a product with superior clarity, i.e., minimizes undesirable latex polymer (emulsion polymer) by-product.

BACKGROUND OF THE INVENTION

Many commercially important polymers, such as polystyrene, poly(methyl methacrylate), poly(vinyl chloride), poly(vinyl acetate), and copolymers such as acrylonitrile-butadiene-styrene, styrene-butylmethacrylate, styrene-divinyl benzene, styrene-diethylaminoethyl methacrylate, and copolymers of vinyl chloride with acrylic or methacrylic acid esters are produced by suspension polymerization. In this process, droplets of monomer, or monomer mixture, containing dissolved catalyst are dispersed in water and each droplet polymerizes independently to form a discrete particle of polymer.

As the suspension polymerization proceeds, the monomer droplets progress from the liquid state through a viscous, sticky, polymer-monomer mixture to solid, spherical polymer particles. A major problem in this process is to prevent coalescence of the particles as the product passes through the viscous, sticky, polymer-monomer mixture stage. This can be accomplished by the use of certain stabilizers. Materials which have been used heretofore as suspension polymerization stabilizers have mostly been water-soluble polymers such as gelatin, pectin, starch, methyl cellulose, CMC, hydroxyethyl cellulose, acrylic or methacrylic acid polymers and copolymers, poly(vinyl alcohol) and poly(vinyl pyrrolidone); or inorganic powders such as kaolin, talc, magnesium silicate, magnesium carbonate, barium sulfate, aluminum hydroxide, tricalcium phosphate, and calcium oxalate.

The use of currently known stabilizers results in some emulsion polymer being formed simultaneously with formation of suspension polymer. An excess of emulsion polymer formation can lead to fouling of the reactor and, of course, reduces the yield of the desired suspension polymer. Salts, such as sodium sulfate, can be added to reduce this by-product, as described in U.S. Pat. Nos. 3,183,208 (Jurgeleit) and 3,642,733 (Anderson et al). See, also, U.S. Pat. No. 3,205,204 (Heckmaier).

While most of the conventional stabilizers work well as stabilizers, they are not totally satisfactory because the particle size of the resultant polymer beads, as well as particle size distribution, i.e., polydispersity, is not easily controlled. Control over polydispersity is especially important in manufacture of products, such as disposable coffee cups and packaging materials, where final density and porosity are determined by initial polydispersity. To control the particle size and polydispersity the stabilizer is usually used in combination with small amounts of a strong surface active agent such as a wetting agent or a soap of the type employed in well known emulsion polymerization procedures.

Landoll, in U.S. Pat. No. 4,352,916, teaches use of hydrophobically modified water-soluble, nonionic cellulose ether polymers, such as hydrophobically modified hydroxyethyl cellulose (HMHEC), hydrophobically modified hydroxypropyl cellulose (HMHPC) and hydrophobically modified methyl cellulose (HMMC), as stabilizers for suspension polymerization of vinyl monomers, such as styrene, etc. These hydrophobically modified water-soluble, nonionic cellulose ether polymers have been found to be useful in controlling the size of the resultant polymer particles and in reducing the amount of emulsion polymer (latex) formed as a by-product of the suspension polymerization process. However, there is still a desire to control suspension polymer particle size distribution, i.e., polydispersity, and to produce a suspension of greater clarity (reduced cloudiness or haziness due to emulsion polymer by-product adsorption onto suspension polymer beads) than is obtained by the suspension polymerization process disclosed by Landoll since, among other things, polymer size distribution control is important in manufacture and clearer suspensions are aesthetically pleasing.

SUMMARY OF THE INVENTION

This invention is directed to suspension polymerization of at least one vinyl monomer in the presence of from about 0.01% to about 0.4% by weight, based on the total monomer content, of at least one hydrophobically modified water-soluble, nonionic cellulose ether and at least one inert electrolyte.

DETAILED DESCRIPTION OF THE INVENTION

The polymers useful in this invention are well known water-soluble polymers which have been modified by chemically incorporating long chain n-alkyl radicals into them to alter the rheological properties of their solutions. The hydrophobically modified water-soluble, nonionic cellulose ether polymers of this invention are described by Landoll in U.S. Pat. No. 4,352,916, cited above. A discussion of these polymers and their preparation is also presented by Landoll in U.S. Pat. No. 4,228,227. They are briefly described below.

The hydrophobically modified water-soluble, nonionic cellulose ether polymers of this invention are nonionic cellulose ethers which are water-soluble, i.e., methyl cellulose, hydroxyethyl cellulose or hydroxypropyl cellulose, further substituted with a $C_6$ to $C_{25}$ alkyl radical in an amount between about 0.2% by weight, based on the weight of the fully substituted cellulose ether polymer, and that amount which renders it less than 1% soluble in water. The long chain alkyl radical (hydrophobe) can be attached via an ether, urethane or ester linkage, but the ether linkage is preferred as it is most stable in aqueous environment.

The modified methyl cellulose useful in this invention has a D.S. of at least about 1.4 and preferably about 1.7 to 2.5 moles of methyl substituent per average anhydroglucose (AHG) unit (i.e., 1.7 to 2.5 hydroxy group per AHG unit are substituted). The hydrophobe is present at about 0.2 to 2% by weight, based on the weight of the fully substituted methyl cellulose polymer.

The modified hydroxyethyl cellulose useful in this invention has a hydroxyethyl M.S. of at least about 1.5 and preferably about 1.5 to about 4.0 (i.e., about 1.5 to about 4.0 moles of hydroxyethyl substitution per average AHG unit) and relatively low to medium molecular weight. The amount of hydrophobe can vary from about 0.2 to about 4% by weight, preferably about 0.2 to about 1.5% by weight, most preferably 0.2 to 1.0% by weight, based on the weight of the fully substituted hydroxyethyl cellulose polymer.

The modified hydroxypropyl cellulose has a hydroxypropyl M.S. of about 2 to about 5 and about 0.1 to about 1.0% hydrophobe by weight, based on the weight of the fully substituted hydroxypropyl cellulose polymer.

Other water-soluble, nonionic cellulose ether polymers useful in this invention include hydroxypropyl methyl cellulose, ethyl hydroxyethyl cellulose and methyl hydroxyethyl cellulose. Substituent levels of these polymers are readily determinable.

Any of the commonly known vinyl monomers can be successfully suspension polymerized or copolymerized using this invention. Typical monomers that may be polymerized or copolymerized in accordance with this invention include, e.g., styrene, styrene derivatives, vinyl halides, vinylidene halides, alkyl methacrylates, vinyl acetate, and acrylonitrile. Examples of styrene derivatives include, e.g., vinyl toluene, alpha methyl styrene, and para methyl styrene. Examples of vinyl halides include, e.g., vinyl chloride and vinyl bromide. Examples of vinylidene halides include, e.g., vinylidene chloride. Examples of alkyl methacrylates include, e.g., methyl methacrylate, butyl methacrylate, and diethylaminoethyl methacrylate. Commercially important monomers which can be polymerized or copolymerized according to this invention include methyl methacrylate, butyl methacrylate, vinyl chloride, styrene, and vinyl acetate.

An "electrolyte" is a substance that will provide ionic conductivity when dissolved in water or when in contact with water. "Inert electrolyte" means any inorganic or organic electrolyte which is not reactive to free radicals associated with the polymerization process, i.e., does not enter into or interface with polymerization. Examples of inert electrolytes suitable for use in this invention include salts of group IA, IIA, IIIA and IIB metals, except mercury, ammonium salts, and organic salts. Exemplary salts include, e.g., aluminum nitrate, aluminum sulfate, ammonium chloride, ammonium nitrate, ammonium sulfate, barium nitrate, borax, calcium chloride, calcium nitrate, calcium sulfate, diammonium phosphate, disodium phosphate, magnesium chloride, magnesium nitrate, magnesium sulfate, potassium chloride, potassium bisulfate, sodium acetate, sodium carbonate, sodium chloride, sodium metaborate, sodium nitrate, sodium sulfate, trisodium phosphate, zinc chloride, zinc nitrate, zinc sulfate, tetraalkyl ammonium acetates such as tetra-methylammonium acetate and tetraethyl ammonium acetate, tetraalkyl ammonium halides such as tetramethyl ammonium chloride, tetraalkyl ammonium formates such as tetramethyl ammonium formate. Two or more inert electrolytes may be used in combination. The most preferred inert electrolyte is sodium sulfate.

Polymerization is effected substantially as heretofore known in the art, in particular, as described in U.S. Pat. No. 4,352,916, cited above, with the exception of using at least one inert electrolyte per this invention. Generally, the suspension polymerization process involves dissolving a polymerization initiator or catalyst (an organo-soluble peroxide or azo compound) in a vinyl monomer, suspending the resultant solution in water containing a suspension stabilizer, and subjecting the suspension to polymerization conditions.

The hydrophobically modified water-soluble, nonionic cellulose ether polymer is preferably present during polymerization in an amount from about 0.05% to about 0.25%, most preferably from 0.05% to 0.2%, by weight, based on the total monomer content.

The optimum amount of inert electrolyte to be used is dependent upon the concentration of the hydrophobically modified, nonionic cellulosic ether polymer (stablilizer) used. Generally, when a high concentration of stabilizer is used, coagulation will result if too much inert electrolyte is used. When small concentrations of stabilizer are used, use of small amounts of inert electrolyte may result in coagulation. Therefore, it is necessary to vary the amounts of stabilizer and inert electrolyte within the aforementioned ranges so that coagulation does not result, i.e., so that a suitable suspension polymer results. The term "vinyl suspension polymer", as used herein, means a suspension polymer of the type generally considered useful in the art and, accordingly, is not inclusive of such undesirable coagulated masses.

The optimum level of inert electrolyte to be used is also dependent on the hydrophobe content of the hydrophobically modified cellulose ether polymer used, the hydrophobicity of the monomer(s), and the hydrophobicity of any other component present during polymerization. Hydrophobically modified water-soluble, nonionic cellulose ether polymers are relatively insensitive to low levels of electrolytes but respond to higher levels by producing polymer beads of smaller average diameter and narrower distributions. This is especially true for hydrophobically-modified polymers of low hydrophobe content (e.g., hydrophobically modified hydroxyethyl cellulose having a hydrophobe content of about 0.2% to about 0.5% by weight, based on the total weight of the substituted polymer). Use of hydrophobically modified water-soluble, nonionic cellulose ether polymers of relatively high hydrophobe content generally results in an increase in average bead diameter, all other factors being equal. For instance, HMHEC having a degree of polymerization of 700 and a hydroxyethyl M.S. of 3.5. having a C-16 hydrophobe content of less than or equal to about 0.7%, addition of inert electrolyte results in a decrease of polydispersity and the greater the amount of electrolyte added (within the scope of this invention), the larger the decrease in polydispersity. In contrast, with HMHEC having the same D.P. and hydroxyethyl M.S., and a C-16 hydrophobe content of greater than about 0.7%, polydispersity is broadened with addition of inert electrolyte and the greater the amount of inert electrolyte that is added (within the scope of this invention), the broader the polydispersity.

The inert electrolyte is generally used in amounts of about 0.1% to about 5%, preferably about 0.5% to about 2.5%, and most preferably about 0.5% to about 1.0%, by weight based on the total monomer content (Two or more inert electrolytes may be used in combination, in which case the total amount of the combination is within the above range). In general, the higher the hydrophobe content of the polymer, the lower the optimum concentration of inert electrolyte required for optimum performance.

Using the technique of the invention, it is possible to prepare fairly uniform polymer particles having diameters within the range of about 20 microns to about 5 mm (number average particle diameter). Variation of particle size depends to a great extent upon the concentration of the stabilizer and inert electrolyte employed. Also, it is desired to minimize or eliminate latex by-product (emulsion polymer formation); however, such by-products are not generally completely eliminated. Typically, using this invention, latex by-products are less than 0.5 wt. %, based on the total product weight.

The invention is illustrated in the following examples, which are exemplary and not intended to be limiting. All parts, percentages, etc., are by weight and all amounts are based on the total weight of the monomers, unless otherwise noted.

The hydrophobically modified hydroxyethyl celluloses ("HMHECs") used in the following examples are identified in the Table below. Each had a hydroxyethyl M.S. of 3.5.

EXAMPLE 1 (CONTROL)

Polymerization of styrene was carried out in a one-liter jacketed resin kettle containing a thermometer, reflux condenser, and a nitrogen inlet, employing a six-blade (45° downward pitch) turbine agitator, with 500 parts by weight of a mixture consisting of (1) 0.1 wt. % HMHEC 1; (2) 49.6 wt. % water; (3) 50.0 wt. % styrene; and (4) 0.3 wt. % benzoyl peroxide (initiator) (predissolved in styrene), all based on the weight of the total mixture. The procedure involved: (a) charging the ingredients to the kettle; (b) heating the materials in the kettle at 85° C. for 6 hours with agitation; (c) cooling the materials in the kettle to room temperature; (d) filtering the mixture to recover the polymer beads, and (e) air drying the beads over night. The agitator rpm, stabilizer concentration, and electrolyte concentration were as noted in Table I. One hundred ppm, based on the total formulation, sodium nitrite was included to inhibit latex formation at the start of polymerization. After filtering the suspension through VWR grade 615 filter paper, the polystyrene beads were sieved though the following screens: U.S.A. Standard 7, 10, 18, 20, 30, 35, 40, 50, 70 and 80 mesh.

The weights retained on each screen were tabulated. Weight and number average bead diameters, and the corresponding ratios (i.e., polydispersity) were determined. Latex by-product was determined gravimetrically after evaporation of the filtrate.

In the following examples, the description of formulations is based on the formulation of Example 1. Where necessary, water was added to maintain the relative amounts of the components.

EXAMPLE 2 (INVENTION)

The procedures of Example 1 were repeated, except that 0.50% $Na_2SO_4$ (electrolyte) was dissolved in the water prior to its use in polymerization ("predissolved in the water").

EXAMPLE 3 (INVENTION)

The procedures of Example 1 were repeated, except that 0.75% $Na_2SO_4$ (inert electrolyte) was predissolved in the water.

EXAMPLE 4 (INVENTION)

The procedures of Example 1 were repeated, except that 1.00% $Na_2SO_4$ (inert electrolyte) was predissolved in the water.

EXAMPLE 5 (COMPARISON)

This comparative example shows that the amounts of stabilizer and inert electrolyte must be properly selected, within the aforementioned ranges, so that coagulation does not result.

The procedures of Example 1 were repeated, except that 2.50% $Na_2SO_4$ (inert electrolyte), based on the weight of the total formulation, was predissolved in the water.

EXAMPLE 6 (INVENTION)

The procedures of Example 2 were repeated, except that the concentration of HMHEC was 0.12 wt. %.

EXAMPLE 7 (INVENTION)

The procedures of Example 2 were repeated, except that the $NaNO_2$ polymerization inhibitor was not used.

EXAMPLE 8 (INVENTION)

The Procedures of Example 4 were repeated, except that the agitator speed was 250 rpm.

EXAMPLE 9 (CONTROL)

The procedures of Example 1 were repeated, except that HMHEC 2 was used in place of HMHEC 1.

EXAMPLE 10 (INVENTION)

The procedures of Example 9 were repeated, except that 0.50% $Na_2SO_4$ (inert electrolyte) was predissolved in the water.

EXAMPLE 11 (INVENTION)

The procedures of Example 9 were repeated, except that 0.75% $Na_2SO_4$ (inert electrolyte) was predissolved in the water.

EXAMPLE 12 (INVENTION)

The Procedures of Example 9 were repeated, except that 1.0% $Na_2SO_4$ (inert electrolyte) was predissolved in the water.

EXAMPLE 13 (CONTROL)

The procedures of Example 5 were repeated, except that HMHEC 3 was used instead of HMHEC 1.

EXAMPLE 14 (INVENTION)

The procedures of Example 13 were repeated, except that 0.50% $Na_2SO_4$ (inert electrolyte) was predissolved in the water.

EXAMPLE 15 (CONTROL)

The procedures of Example 1 were repeated, except that HMHEC 4 was used in place of HMHEC 1.

EXAMPLE 16 (CONTROL)

The procedures of Example 15 were repeated, except that agitation was increased to 600 rpm and $NaNO_2$ (polymerization inhibitor) was not used.

The following control and comparative examples show use of an exemplary inert polyelectrolyte (i.e., an oligomer, polymer, or copolymer containing ionic constituents, and which is not reactive to free radicals associated with the polymerization process, such as salts of carboxymethyl cellulose, salts of acrylate polymers, vinyl acetate-acrylic acid copolymers, vinyl acetate-crotonic acid copolymers, etc.) in suspension polymerization. Typically such inert polyelectrolytes are used in an amount of 0.02 to 5%, by weight of the monomer. The following examples are illustrative:

EXAMPLE 17 (COMPARISON)

The procedures of Example 15 were repeated, except that 0.10% CMC-A having a carboxymethyl D.S. of 0.2 and a D.P. of 2300 (inert polyelectrolyte) was predissolved in the water.

The results are shown in the following table and are discussed below.

EXAMPLE 18 (COMPARISON)

The procedures of Example 1 were repeated, except that 0.10% of a CMC-B having a carboxymethyl D.S. of 2.0 and a D.P. of 1300 (inert polyelectrolyte) was predissolved in the water.

EXAMPLE 19 (COMPARISON)

The procedures of Example 18 were repeated, except that the agitation speed was 290 rpm.

EXAMPLE 20 (COMPARISON)

The procedures of Example 19 were repeated, except that the HMHEC 1 concentration was 0.11 wt. % and the concentration of CMC-B was 0.11%.

EXAMPLE 21 (COMPARISON)

The procedures of Example 19 were carried out, except that the concentration of CMC-B was 0.10% and $NaNO_2$ (polymerization inhibitor) was not used.

In the following control and comparative examples, hydroxyethyl cellulose (HEC) is used in place of HMHEC. The HEC used, labeled hereinafter HEC 1, was Natrosol ™ 250 JR HEC (available from the Aqualon Company, Wilmington, Del.; Natrosol is a trademark of the Aqualon Company).

EXAMPLE 22 (CONTROL)

This example was carried out in the same manner as Example 1, except that HEC 1 was used in place of HMHEC 1.

EXAMPLE 23 (COMPARISON)

This example was carried out in the same manner as Example 22, except that 1.0% $Na_2SO_4$ (inert electrolyte) was predissolved in the water.

EXAMPLE 24 (CONTROL)

This example was carried out in the same manner as Example 22, except that 0.5% HEC 1 was used.

EXAMPLE 25 (COMPARISON)

This example was carried out in the same manner as Example 24, except that 0.5% $Na_2SO_4$ (inert electrolyte) was predissolved in the water.

EXAMPLE 26 (COMPARISON)

This example was carried out in the same manner as Example 24, except that 1.0% $Na_2SO_4$ was predissolved in the water.

TABLE I

| Example | Hydrophobe Length/ Wt. % | Conc. Wt. %[1] | Agitator rpm | Bead Diameter (mm) Wt. Ave. = Dw | Polydispersity Dw/Dn[2] | % Beads Recovered | % Latex | Electrolyte/ Polyelectrolyte (Wt. %) | Comments |
|---|---|---|---|---|---|---|---|---|---|
| (1) (Control) HMHEC 1 | C-16/0.4 | 0.10 | 325 | 0.834 | 3.0 | 97.3 | 0.45 | — | |
| (2) (Invention) HMHEC 1 | C-16/0.4 | 0.10 | 325 | 0.825 | 2.9 | 97.6 | 0.05 | 0.50% $Na_2SO_4$ | |
| (3) (Invention) HMHEC 1 | C-16/0.4 | 0.10 | 325 | 0.770 | 2.5 | 97.8 | 0.05 | 0.75% $Na_2SO_4$ | |
| (4) (Invention) HMHEC 1 | C-16/0.4 | 0.10 | 325 | 0.642 | 1.8 | 98.6 | 0.05 | 1.00% $Na_2SO_4$ | |
| (5) (Comparison) HMHEC 1 | C-16/0.4 | 0.10 | 325 | Coagulated | — | — | 0.05 | 2.50% $Na_2SO_4$ | |
| (6) (Invention) HMHEC 1 | C-16/0.4 | 0.12 | 325 | 0.759 | 2.7 | 97.3 | 0.05 | 0.50% $Na_2SO_4$ | |
| (7) (Invention) HMHEC 1 | C-16/0.4 | 0.10 | 325 | 0.745 | 3.3 | 98.9 | 0.05 | 0.50% $Na_2SO_4$ | No inhibitor. |
| (8) (Invention) HMHEC 1 | C-16/0.4 | 0.10 | 250 | 1.07 | 3.1 | 97.1 | 0.05 | 1.00% $Na_2SO_4$ | |
| (9) (Control) HMHEC 2 | C-16/0.7 | 0.10 | 325 | 0.945 | 2.0 | 98.9 | 0.75 | — | |
| (10) (Invention) HMHEC 2 | C-16/0.7 | 0.10 | 325 | 0.955 | 1.7 | 99.0 | 0.05 | 0.50% $Na_2SO_4$ | |
| (11) (Invention) HMHEC 2 | C-16/0.7 | 0.10 | 325 | 0.98 | 1.6 | 98.8 | 0.05 | 0.75% $Na_2SO_4$ | |
| (12) (Invention) HMHEC 2 | C-16/0.7 | 0.10 | 325 | 1.04 | 1.4 | 98.9 | 0.05 | 1.0% $Na_2SO_4$ | |
| (13) (Control) HMHEC 3 | C-8/0.8 | 0.10 | 325 | 0.744 | 2.8 | 98.1 | 0.81 | — | |
| (14) (Invention) HMHEC 3 | C-8/0.8 | 0.10 | 325 | 0.755 | 2.8 | 98.6 | 0.05 | 0.50% $Na_2SO_4$ | |
| (15) (Control) | C-16/0.45 | 0.10 | 325 | 0.729 | 3.6 | 96.1 | 0.36 | — | |

TABLE I-continued

| Example | Hydrophobe Length/ Wt. % | Conc. Wt. %[1] | Agitator rpm | Bead Diameter (mm) Wt. Ave. = Dw | Polydispersity Dw/Dn[2] | % Beads Recovered | % Latex | Electrolyte/ Polyelectrolyte (Wt. %) | Comments |
|---|---|---|---|---|---|---|---|---|---|
| (16) (Control) HMHEC 4 | C-16/0.45 | 0.10 | 600 | 0.509 | 1.9 | 97.9 | 3.4 | — | No inhibitor. |
| (17) (Comparison) HMHEC 4 | C-16/0.45 | 0.10 | 600 | 0.664 | 2.3 | 99.4 | 0.14 | 0.10% CMC-A | No inhibitor. |
| (18) (Comparison) HMHEC 4 | C-16/0.4 | 0.10 | 325 | 0.888 | 3.1 | 97.0 | 0.05 | 0.10% CMC-B | |
| (19) (Comparison) HMHEC 1 | C-16/0.4 | 0.10 | 290 | 0.794 | 3.2 | 98.0 | 0.05 | 0.10% CMC-B | |
| (20) (Comparison) HMHEC 1 | C-16/0.4 | 0.11 | 290 | 0.610 | 2.7 | 98.3 | 0.05 | 0.11% CMC-B | |
| (21) (Comparison) HMHEC 1 | C-16/0.4 | 0.10 | 290 | 0.652 | 2.5 | 98.2 | 0.05 | 0.10% CMC-B | No inhibitor. |
| (22) (Control) HEC 1 | — | 0.10 | 325 | Coagulated | — | 0 | — | — | |
| (23) (Comparison) HEC 1 | — | 0.10 | 325 | Coagulated | — | 0 | — | 1.0% Na$_2$SO$_4$ | |
| (24) (Control) HEC 1 | — | 0.5 | 325 | 0.79 | 3.0 | 97.0 | 1.0 | — | |
| (25) (Comparison) HEC 1 | — | 0.5 | 325 | 0.75 | 2.8 | 98.5 | 0.5 | 0.5% NA$_2$SO$_4$ | |
| (26) (Comparison) HEC 1 | — | 0.5 | 325 | 0.73 | 2.7 | 98.5 | 0.5 | 1.0% NA$_2$SO$_4$ | |

[1]Concentration based on total wt. of HMHEC, water (including any electrolyte or polyelectrolyte dissolved therein, styrene and benzoyl peroxide).
[2]Weight average particle diameter/number average particle diameter.

The above Table shows, among other things, that the effect of added electrolytes on the properties of HMHEC-stabilized polystyrene beads depends on both the concentration of the electrolyte, the concentration of HMHEC, and hydrophobe content of the HMHEC.

Examples 9 versus 10 and 13 versus 14 illustrate the electrolyte effect of HMHECs of higher hydrophobe content compared to example 2, at equivalent electrolyte levels. In both instances the average bead diameter increases slightly due to the presence of the electrolyte. This contrasts with example 1 versus example 2, which demonstrates a slight reduction in bead diameter in the presence of the electrolyte, for HMHECs of low hydrophobe content.

Most notable is that the data demonstrate the ability to control polydispersity with electrolytes. Examples 1 through 4 (HMHEC I) and 9 through 12 (HMHEC 2) show that polydispersity is controlled by adding inert electrolyte. With HMHEC I (Examples 2-4) both bead diameters and polydispersity decreased as larger amounts of inert electrolyte were used. With HMHEC 2 (Examples 10-12) polydispersity decreased, despite bead diameter increases, as larger amounts of inert electrolyte were used. Thus, it can be seen that improved polydispersity control was independent of effect on bead diameter. Coagulation resulted in Example 5 due to the ratio of the electrolyte to polymer.

It is difficult to measure low latex levels gravimetrically for examples containing inert electrolytes due to interference from the inert electrolytes. Precise measurements of latex levels lower than 0.05% could not be accurately made in their presence. Moreover, such accurate measurements were found to be unnecessary as lower latex levels, less than 0.05%, were found to occur in samples wherein inert electrolytes were used whereas when HMHEC was used alone, much higher latex levels were found to occur.

Comparative examples 15 through 21 show that inert polyelectrolytes appear to be more efficient in their modification of HMHEC behavior than are inert electrolytes, requiring only 0.02% (based on total monomer content) to produce significant changes (usually increases) in bead diameter. Here a reduction in agitation rate actually produces a smaller average bead diameter, the opposite of what would be expected. However, no trend toward control of polydispersity is seen with such inert polyelectrolytes.

The same difficulties encountered with measuring latex by-product with inert electrolytes were encountered with inert polyelectrolytes. Again, however, latex levels were found to be less than 0.05%.

When HEC was used at a concentration of 0.10%, coagulation resulted. Therefore, it was necessary to run HEC examples at 0.5% concentration.

When HEC was used only minor changes in polydispersity were noted. For instance, when 1.0% Na$_2$SO$_4$ was added polydispersity decreased from 3.0 (Control Example 1) to 1.8 (Example 4) using HMHEC 1 and from 2.0 (Control Example 9) to 1.4 (Example 12) using HMHEC 2, whereas it only decreased from 3.0 (Control Example 24) to 2.7 (Comparative Example 26) using HEC 1.

Electrolytes reduced latex by-products when used with both HMHEC and HEC. However, the reduction in latex by-products was much greater with HMHEC.

While this invention has been described with respect to specific embodiments, it should be understood that these embodiments are not intended to be limiting and that many variations and modifications are possible without departing from the scope of this invention.

What I claim is:

1. A process for forming a vinyl suspension polymer by suspension polymerization, comprising suspension polymerization of at least one vinyl monomer in the presence of (a) from about 0.01% to about 0.4% by weight, based on the total monomers, of at least one water-soluble, nonionic hydrophobically modified cellulose ether polymer selected from the group consisting of hydrophobically modified hydroxyethyl cellulose, hydrophobically modified hydroxypropyl cellulose, and hydrophobically modified methyl cellulose, and (b) at least one inert inorganic electrolyte.

2. A process as claimed in claim 1 wherein the hydrophobically modified water-soluble, nonionic cellulose ether polymer is hydrophobically modified with a $C_6$ to $C_{25}$ long-chain alkyl radical in an amount between about 0.2% by weight, based on the weight of the fully substituted cellulose ether polymer, and an amount sufficient to render said ether less than 1% soluble in water.

3. A process as claimed in claim 2 wherein the hydrophobically modified water-soluble, nonionic cellulose ether polymer is the hydrophobically modified hydroxyethyl cellulose.

4. A process as claimed in claim 3 wherein the hydrophobically modified hydroxyethyl cellulose has a hydroxyethyl M.S. of at least about 1.5 and about 0.2% to about 4% by weight, based on the weight of the fully substituted hydroxyethyl cellulose, of the long-chain alkyl radical.

5. A process as claimed in claim 3 wherein the hydrophobically modified hydroxyethyl cellulose has a hydroxyethyl M.S. of about 1.5 to 4.0 and about 0.2% to about 1.5% by weight, based on the weight of the fully substituted hydroxyethyl cellulose, of the long-chain alkyl radical.

6. A process as claimed in claim 2 wherein the hydrophobically modified water-soluble, nonionic cellulose ether polymer is the hydrophobically modified hydroxypropyl cellulose and the hydrophobically modified hydroxypropyl cellulose has an M.S. of about 2 to about 5 and about 0.1% to about 1.0% by weight, based on the weight of the fully substituted hydroxypropyl cellulose, of the long-chain alkyl radical.

7. A process as claimed in claim 2 wherein the at least one hydrophobically modified water-soluble, nonionic cellulose ether polymer is the hydrophobically modified methyl cellulose and the hydrophobically modified methyl cellulose has a D.S. of about 1.7 to about 2.5 and about 0.2% to about 2% by weight, based on the weight of the fully substituted methyl cellulose, of the long-chain alkyl radical.

8. A process as claimed in claim 2 wherein the at least one hydrophobically-modified water-soluble, nonionic cellulose ether polymer is present in an amount of about 0.05% to about 0.25%.

9. A process as claimed in claim 5 wherein the hydrophobically modified hydroxyethyl cellulose is present in an amount of about 0.05% to about 0.2%.

10. A process as claimed in claim 2 wherein the inert electrolyte is present in an amount of about 0.1% to about 5% by weight, based on the weight of the total monomers.

11. A process as claimed in claim 5 wherein the inert electrolyte is present in an amount of about 0.5% to about 1.0% by weight, based on the weight of the total monomers.

12. A process as claimed in claim 10 wherein the electrolyte is selected from the group consisting of aluminum nitrate, aluminum sulfate, ammonium chloride, ammonium nitrate, ammonium sulfate, barium nitrate, borax, calcium chloride, calcium nitrate, calcium sulfate, diammonium phosphate, disodium phosphate, magnesium chloride, magnesium nitrate, magnesium sulfate, potassium chloride, potassium bisulfate, sodium acetate, sodium carbonate, sodium chloride, sodium metaborate, sodium nitrate, sodium sulfate, trisodium phosphate, zinc chloride, zinc nitrate and zinc sulfate.

13. A process as claimed in claim 11 wherein the electrolyte is sodium sulfate.

14. A process as claimed in claim 2 wherein the vinyl monomer is selected from the group consisting of styrene, styrene derivatives, vinyl halides, vinylidene halides, alkyl methacrylates, vinyl acetate, and acrylonitrile.

15. A process as claimed in claim 5 wherein the vinyl monomer is selected from the group consisting of styrene, methyl methacrylate, butyl methacrylate, vinyl chloride, and vinyl acetate.

16. A process as claimed in claim 11 wherein the vinyl monomer is styrene.

17. A process a claimed in claim 2 wherein suspension polymerization is carried out with a initiator or catalyst selected from the group consisting of organo-soluble peroxide initiator and azo initiators, and the vinyl suspension polymer has a number average particle diameter of about 20 microns to about 5 mm.

18. A process as claimed in claim 2 wherein less than 0.5 wt. %, based on the total product weight, latex by-products results from the suspension polymerization.

19. A process as claimed in claim 4, when the resultant polymer has a diameter of 20 microns to 5 mm.

* * * * *